US012427087B2

(12) United States Patent
Huang et al.

(10) Patent No.: US 12,427,087 B2
(45) Date of Patent: Sep. 30, 2025

(54) INFLATABLE MASSAGE POOL

(71) Applicant: BESTWAY INFLATABLES & MATERIAL CORP., Shanghai (CN)

(72) Inventors: Shuiyong Huang, Shanghai (CN); Xianglin Zeng, Shanghai (CN); Qingshui Song, Sanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 515 days.

(21) Appl. No.: 17/763,771

(22) PCT Filed: Mar. 17, 2020

(86) PCT No.: PCT/CN2020/079659
§ 371 (c)(1),
(2) Date: Mar. 25, 2022

(87) PCT Pub. No.: WO2021/056986
PCT Pub. Date: Apr. 1, 2021

(65) Prior Publication Data

US 2022/0339063 A1 Oct. 27, 2022

(30) Foreign Application Priority Data

Sep. 26, 2019 (CN) ........................ 201921621760.9

(51) Int. Cl.
*A61H 33/00* (2006.01)

(52) U.S. Cl.
CPC ......... *A61H 33/60* (2013.01); *A61H 33/6021* (2013.01); *A61H 33/601* (2013.01); *A61H 33/6068* (2013.01); *A61H 2201/0103* (2013.01)

(58) Field of Classification Search
CPC .. A61H 33/6021-6063; A61H 33/6094; A61H 99/00; E04H 4/0025; F04B 53/06; F16K 24/04
See application file for complete search history.

(56) References Cited

U.S. PATENT DOCUMENTS 4,104,004 A * 8/1978 Graef ...................... F04B 53/06 417/313
4,773,104 A * 9/1988 Wang ................ A61H 33/6036 4/492

(Continued)

FOREIGN PATENT DOCUMENTS

CN 2676897 2/2005
CN 2794505 7/2006

(Continued)

OTHER PUBLICATIONS

Extended European Search Report issued Oct. 9, 2023 (Oct. 9, 2023), 7 pages, on related European Patent Application 20869077.6 by the European Patent Office.

(Continued)

*Primary Examiner* — David P Angwin
*Assistant Examiner* — Nicholas A Ros
(74) *Attorney, Agent, or Firm* — DICKINSON WRIGHT PLLC

(57) ABSTRACT

An inflatable massage pool comprises a pool body defining an inflatable cavity and a water receiving cavity. A water inlet assembly, located in the inflatable cavity, is configured to provide one of a filtered water flow or a massage water flow to the water receiving cavity. The water inlet assembly includes a water inlet pipe and a water flow guiding device. The water inlet pipe has a water inlet passage in fluid communication with the water flow guiding device for delivering one of the filtered water flow or the massage water flow to the water receiving cavity. The water inlet passage and the water flow guiding device delivers the massage water flow and the filtered water flow into the water receiving cavity in different paths or the same path, thereby reducing welding points on a pool wall, lowering the manu- (Continued)

facturing cost, and reducing the difficulty in pipeline arrangement.

18 Claims, 17 Drawing Sheets

(56) References Cited

U.S. PATENT DOCUMENTS

| | | | | | |
|---|---|---|---|---|---|
| 4,907,305 | A * | 3/1990 | Teramachi | B01F 23/231 | 261/36.1 |
| 6,474,373 | B1 * | 11/2002 | Sejnowski | E04H 4/0025 | 4/492 |
| 7,025,079 | B1 * | 4/2006 | Elnar | F16K 24/04 | 4/541.3 |
| 7,493,665 | B2 * | 2/2009 | Williams | A61H 33/6063 | 4/492 |
| 9,254,240 | B2 * | 2/2016 | Lin | A47K 3/06 | |
| 10,883,493 | B1 * | 1/2021 | Walden | F04B 53/1097 | |
| 2008/0141449 | A1 * | 6/2008 | Ren | A61H 33/60 | 601/154 |
| 2009/0241252 | A1 * | 10/2009 | Li | A61H 33/02 | 4/541.1 |

FOREIGN PATENT DOCUMENTS

| | | |
|---|---|---|
| CN | 201099997 | 8/2008 |
| CN | 203583941 | 5/2014 |
| CN | 203583942 | 5/2014 |
| CN | 104864112 | 8/2015 |
| CN | 205296923 | 6/2016 |
| CN | 210858153 | 6/2020 |
| EP | 1138307 | 10/2001 |
| JP | S6439730 | 3/1989 |

OTHER PUBLICATIONS

Canadian Office Action dated Jun. 20, 2023 (Jun. 20, 2023), 5 pages, issued on related Canadian patent application 3,152,360 by the Canadian Intellectual Property Office.

Chinese Office Action dated Jan. 9, 2025 (Jan. 9, 2025), 21 pages (to include English Machine translation of Office Action), issued on related Chinese Patent Application 201910914418.6, by the China National Intellectual Property Administration.

Decision to Reject Application / Chinese Office Action dated Jun. 12, 2025 (Jun. 12, 2025) xx pages (including machine generated English translation) issued on related Chinese Patent Application 201910914418.6 by the China National Intellectual Property Administration.

* cited by examiner

INFLATABLE MASSAGE POOL

CROSS REFERENCE TO RELATED APPLICATIONS

The present application is a U.S. National Phase patent application of and claims priority to PCT/CN2020/079659, filed Mar. 17, 2020, which claims priority to Chinese Patent Application Ser. No. CN201921621760.9, filed on Sep. 26, 2019, the entire disclosures of which are hereby incorporated herein by reference in their entireties.

TECHNICAL FIELD

The present invention generally relates to pools, and in particular to an inflatable massage pool.

BACKGROUND ART

An inflatable massage pool provides a massage function by using a plurality of massage nozzles provided by the inflatable massage pool to spray water into the pool. Accordingly, the inflatable massage pool comprises a massage water circulation system wherein water flows from the pool through a water outlet pipe of the pool into the massage water circulation system, the water passing through a massage water pump and a water inlet pipe to the pool from of the massage water circulation system which returns massage water flow to the pool through massage nozzles. Typically, the inflatable massage pool further comprises a filtered water circulation system wherein water flows from the pool through a water outlet pipe of the pool into the filtered water circulation system, and returns to the pool through a filter pump and a water inlet pipe of the inflatable massage pool.

Because the amount of the massage water flow and the amount of the filtered water flow are different from one another, pipeline systems of the massage water circulation system and the filtered water circulation system are usually separated. In other words, the massage water circulation system has its own water inlet and outlet pipes while the filtered water circulation system also has its own water inlet and outlet pipes. When manufacturing the pool, the water inlet and outlet pipes of the massage water circulation system and the filtered water circulation system must be welded to a pool wall when passing through the pool wall. Therefore, the pool wall has to include a plurality of welding points, which increases the manufacturing cost, and also increases the difficulty in pipeline arrangement.

SUMMARY OF THE INVENTION

In order to solve the above problems in the prior art, the present invention aims to provide a new inflatable massage pool, where a filtered water inlet pipe and a massage water inlet pipe are partially overlapped, and a filtered water flow and a massage water flow are guided by a water flow guiding device, which solves the problem of high costs caused by welding two pipes, if the filtered water inlet pipe and the massage water inlet pipe are independent, to a pool wall respectively, and the problem of difficult arrangement.

It is one aspect of the present invention to provide an inflatable massage pool. The inflatable massage pool comprises a pool body defining an inflatable cavity and a water receiving cavity. A water inlet assembly, located in the inflatable cavity and configured to provide one of a filtered water flow or a massage water flow to the water receiving cavity. The water inlet assembly includes a water inlet pipe and a water flow guiding device, the water inlet pipe having a water inlet passage in fluid communication with the water flow guiding device for delivering one of the filtered water flow or the massage water flow from the water inlet pipe to the water receiving cavity.

According to an embodiment of the present invention, the water inlet assembly can include a massage water flow pipeline in fluid communication with the water flow guiding device, and wherein the water flow guiding device is configured to deliver the filtered water flow to the water receiving cavity and to deliver the massage water flow to the water receiving cavity through the massage water flow pipeline.

According to an embodiment of the present invention, the massage water flow pipeline can be coupled to the water flow guiding device via a three-way pipe for receiving the massage water flow from the water inlet assembly.

According to an embodiment of the present invention, the water inlet assembly can include a housing defining a housing chamber, the housing including a panel located on an inner side wall of the pool body, the panel being exposed to the water receiving cavity.

According to an embodiment of the present invention, the housing can define a water inlet and a water outlet; wherein the water inlet pipe is in fluid communication with the water inlet, the water inlet being located near an upper portion of the housing and the water outlet being located near a lower portion of the housing; and wherein the water outlet is in fluid communication with the massage water flow pipeline.

According to an embodiment of the present invention, the housing can include a retractable pipe located in the housing chamber and coupled to the upper portion of the housing in fluid communication with the water inlet assembly and the water receiving cavity; and wherein the retractable pipe is movable between an expanded state and a contracted state, wherein when the retractable pipe is in the expanded state, the retractable pipe is in fluid communication with the water inlet pipe to allow direct delivery of the filtered water flow into the water receiving cavity and, wherein when the retractable pipe is in the contracted state, the retractable pipe is disconnected from the water inlet pipe to allow delivery of the massage water flow to the massage water flow pipeline through the water outlet.

According to an embodiment of the present invention, the retractable pipe can include a fixed portion coupled to the housing; and a retractable portion being slidable relative to the fixed portion between the expanded state and the contracted state.

According to an embodiment of the present invention, the inflatable massage pool can further include an elastic member located between the fixed portion and the retractable portion; wherein the elastic member connects the retractable portion in the expanded state with the water inlet to allow the filtered water flow to enter the water flow guiding device, and wherein the elastic member disconnects the retractable portion in the contracted state from the water inlet to allow the massage water flow to exit the water guiding device through the water outlet.

According to an embodiment of the present invention, the elastic member can comprise a spring with one end of the spring abutting the retractable portion and another end of the spring abutting the fixed portion or the panel.

According to an embodiment of the present invention, the retractable portion can be sheathed inside the fixed portion.

According to an embodiment of the present invention, the retractable portion can be radially spaced apart from the fixed portion and extends about the fixed portion.

According to an embodiment of the present invention, the retractable portion can include a baffle located at an end of the retractable portion and facing the water inlet to subject the retractable portion to a fluid pressure from one of the filtered water flow or the massage water flow.

According to an embodiment of the present invention, the baffle can define a plurality of water inlet orifices in fluid communication with the water inlet.

According to an embodiment of the present invention, the plurality of water inlet orifices can be located between a periphery of the baffle and an inner surface of the retractable portion and circumferentially spaced apart from one another.

According to an embodiment of the present invention, the water flow guiding device can include a filtered outlet pipe located near a lower portion of the housing and extending through the housing for discharging water from the water receiving cavity for filtration.

According to an embodiment of the present invention, the water flow guiding device can include a fixing plate, located in the housing, extending between a fixed portion of the retractable pipe and the filtered outlet pipe and coupled to the fixed portion and the filtered outlet pipe.

According to an embodiment of the present invention, the housing can defines a water inlet, a water outlet, and a vent port; wherein the water inlet pipe is in fluid communication with the water inlet, the water inlet being located near an upper portion of the housing and the water outlet being located near a lower portion of the housing; and wherein the vent port is in fluid communication with an opening in the panel and near the upper portion of the housing for discharging air.

According to an embodiment of the present invention, the inflatable massage pool can further include a valve disposed in the vent port for regulating air flow through the vent port.

According to an embodiment of the present invention, the water flow guiding device includes a filtered outlet pipe located near a lower portion of the housing and extending through the housing for discharging water from the water receiving cavity for filtration.

According to an embodiment of the present invention, the water inlet assembly can include one or more air pipelines, wherein each of the one or more air pipelines has an air inlet and an air pipe, the air pipe being in fluid communication with the air inlet; and wherein the massage water flow pipeline includes a plurality of massage water flow pipes and a plurality of massage nozzles, each massage nozzle of the plurality of massage nozzles being in fluid communication with a respective massage water flow pipe and a respective air pipe for delivering the massage water flow into the water receiving cavity.

The above advantages and other advantages and features will become apparent from the following detailed descriptions of preferred embodiments with reference to the accompanying drawings.

BRIEF DESCRIPTION OF THE DRAWINGS

For a more complete understanding of the present invention, reference should now be made to the embodiments illustrated in the accompanying drawings in more detail and described by examples of the present invention below, in which.

DETAILED DESCRIPTION OF THE INVENTION

As will be understood by those having ordinary skill in the art, each of the features of an embodiment shown and described with reference to any one of the drawings can be combined with features shown in one or more other drawings to form other embodiments not explicitly shown or described. The combinations of features shown provide representative embodiments for typical applications. However, various combinations and modifications of the features can be expected in accordance with the teachings of the present disclosure for particular applications or implementations.

Throughout the specification, the terms “upper”, “lower”, “left”, “right”, etc. are used for the convenience of description, and are not restrictive.

Embodiment 1

Figure 1:
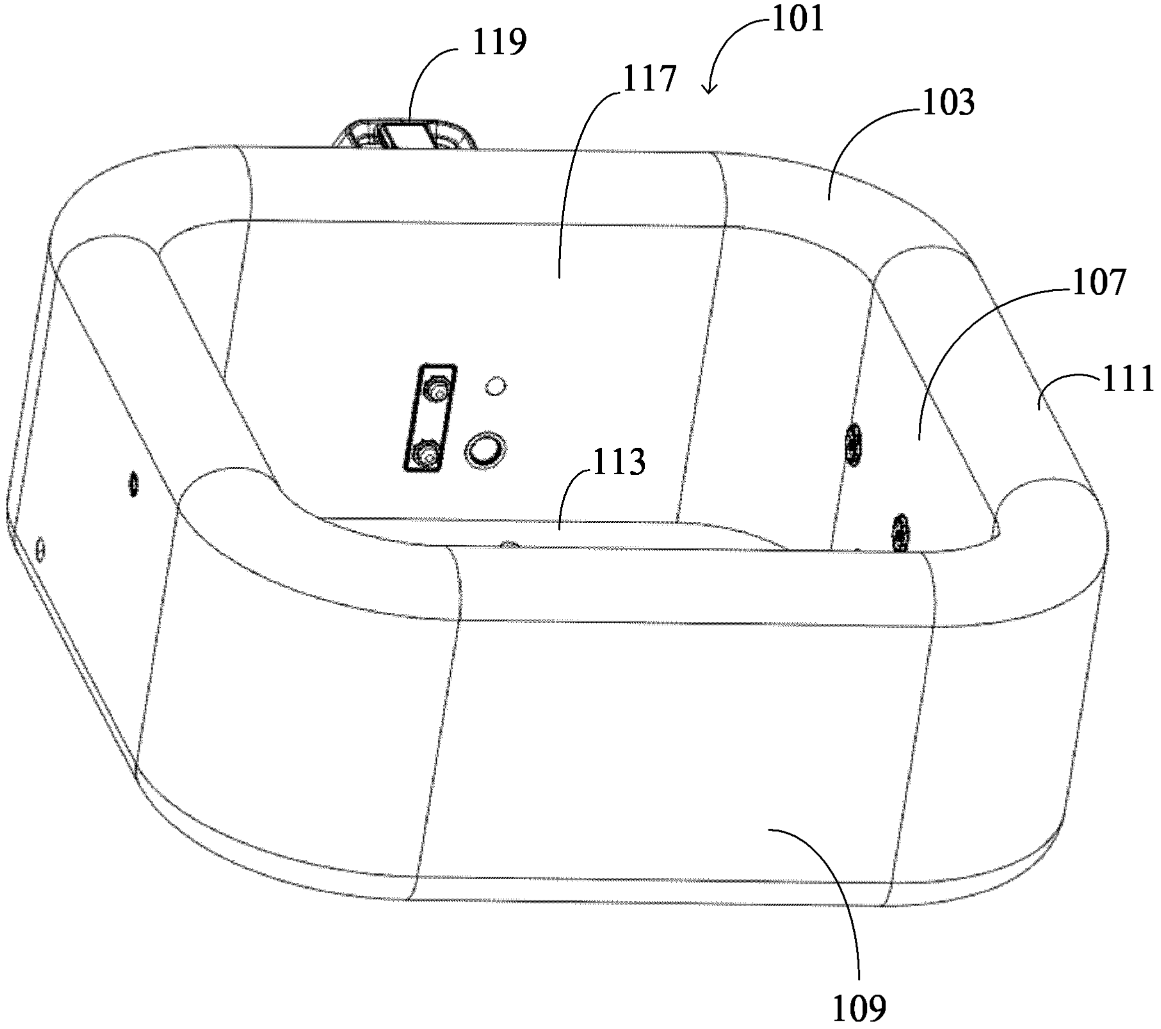
FIG. 1 is a perspective view of the inflatable massage pool constructed according to one embodiment of the present invention.
Figure 2:
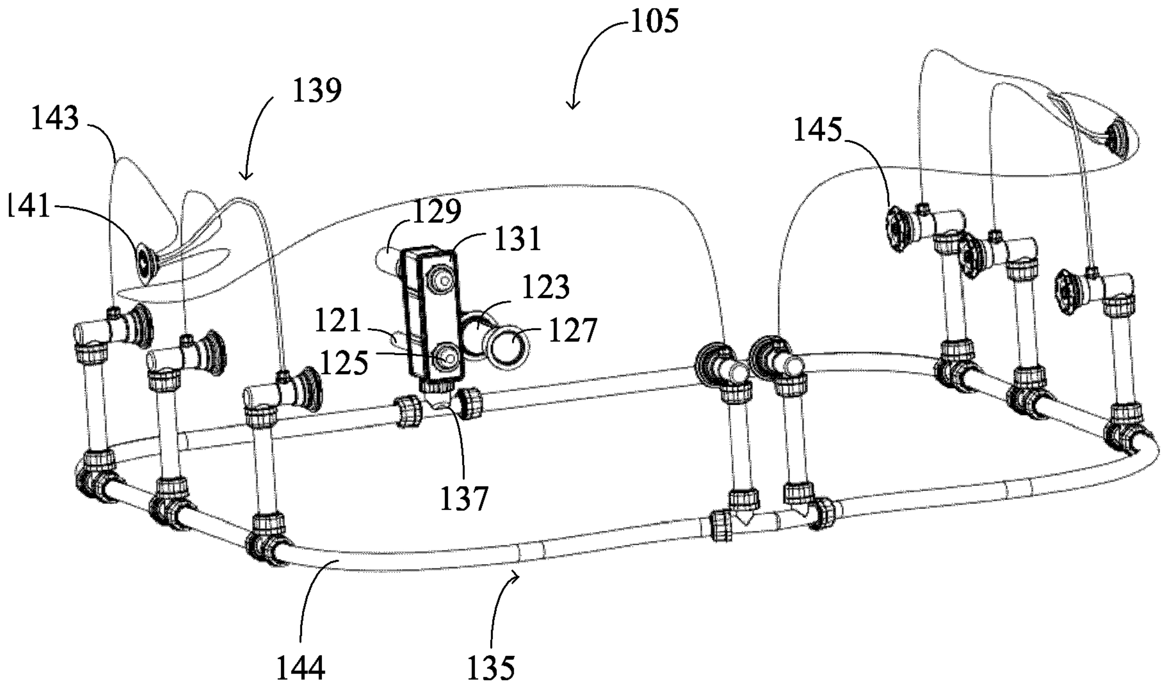
FIG. 2 is a perspective view of a water circulation system for the inflatable massage pool.
Figure 3:
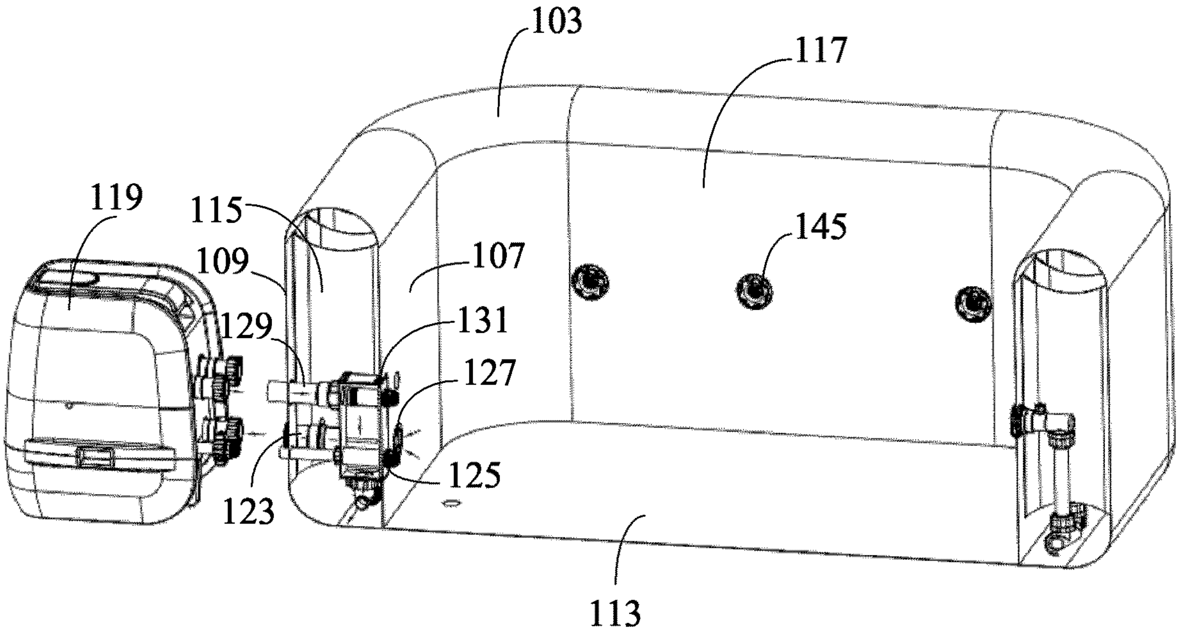
FIG. 3 is a cross-sectional perspective view of the inflatable massage pool including the water circulation system delivering a massage water flow to the inflatable massage pool.

As best illustrated in FIGS. 1-3, an inflatable massage pool 101 constructed in accordance with one embodiment of the present invention comprises a pool body 103 and a water circulation system 105. The pool body 103 comprises an inner side wall 107, an outer side wall 109, a top wall 111, and a bottom wall 113. The pool body 103 defines an inflatable cavity 115 extending between the inner side wall 107, the outer side wall 109, the top wall 111, and the bottom wall 113. The pool body 103 defines a water receiving cavity 117 enclosed by the inner side wall 107 and the bottom wall 113. According to one embodiment of the present invention, the pool body 103 has a rectangular shape. It should be appreciated that the pool body 103 can be of different shapes, such as a circular shape. The inner side wall 107, the outer side wall 109, the top wall 111, and the bottom wall 113 of the pool body 103 may be made from a flexible material, for example, a PVC material. The inner side wall 107, the outer side wall 109, the top wall 111, and the bottom wall 113 of the pool body 103 may be joined together by ultrasonic welding, bonding, etc.

The water circulation system 105 comprises a pump 119, a water inlet assembly, and a water outlet assembly. The water outlet assembly comprises a filtered water outlet pipe 121 and a massage water outlet pipe 123. The filtered water outlet pipe 121 discharges water from the water receiving cavity 117 for filtration to form a filtered water flow and returns the water to the water receiving cavity 117. The massage water outlet pipe 123 discharges the water from the water receiving cavity 117 to form a massage water flow and returns the water to the water receiving cavity 117. An opening 125 at one end of the filtered water outlet pipe 121 and an opening 127 at one end of the massage water outlet pipe 123 are both provided on the inner side wall 107 of the pool body 103, such that the water can enter the filtered water outlet pipe 121 and the massage water outlet pipe 123 through the water receiving cavity 117. The other ends of the filtered water outlet pipe 121 and the massage water outlet pipe 123 penetrate through the outer side wall 109 of the pool body 103 and are connected to the pump 119 for delivering the water in the water receiving cavity 117 to the pump 119. The pump 119 is separately disposed on the outside of the pool body 103 and connected to the filtered water outlet pipe 121 and the massage water outlet pipe 123. According to one embodiment of the present invention, the pump 119 can include two different components, e.g. a filtered water pump (not shown) and a massage water pump (not shown), for delivering the filtered water flow and the massage water flow, respectively.

As shown in FIGS. 2 and 3, the water inlet assembly is substantially disposed in the inflatable cavity 115. In other words, most parts of the water inlet assembly are disposed inside the inflatable cavity 115. The water inlet assembly can deliver the filtered water flow and/or the massage water flow to the water receiving cavity 117. Specifically, the water inlet assembly comprises a water inlet pipe 129 and a water flow guiding device 131. The water inlet pipe 129 defines a water inlet passage 133 (see FIG. 5) through which the filtered water flow and the massage water flow are delivered. The water flow guiding device 131 is in fluid communication with the water inlet pipe 129 to deliver the filtered water flow and/or the massage water flow from the water inlet pipe 129 to the water receiving cavity 117.

Accordingly, only the water inlet pipe 129 is connected from the pump 119 to provide the inflow of the massage water flow and/or the filtered water flow, thereby reducing welding points on the side walls 107, 109 of the pool body 103, lowering the manufacturing cost, and also facilitating the arrangement of pipelines.

As shown in FIGS. 2 and 3, the water inlet assembly comprises a massage water flow pipeline 135, the massage water flow pipeline 135 being in fluid communication with the water flow guiding device 131, and the water flow guiding device 131 can directly deliver the filtered water flow to the water receiving cavity 117 and the massage water flow to the water receiving cavity 117 through the massage water flow pipeline 135. The water inlet assembly further comprises a three-way pipe 137 coupled to the water guiding device 131. The massage water flow pipeline 135 is in fluid communication with the water flow guiding device 131 via the three-way pipe 137 wherein the water flow guiding device 131 delivers the massage water flow to the water receiving cavity 117 via the massage water flow pipeline 135. Further, the water inlet assembly also comprises an air pipeline 139. The air pipeline 139 comprises an air inlet 141 and an air pipe 143 in fluid communication with the air inlet 141. The massage water flow pipeline 135 further comprises a massage water flow pipe 144 and massage nozzles 145 in fluid communication with the massage water flow pipe 144, and the massage nozzles 145 are also in fluid communication with the air pipe 143 to deliver the massage water flow into the water receiving cavity 117.

Figure 6:
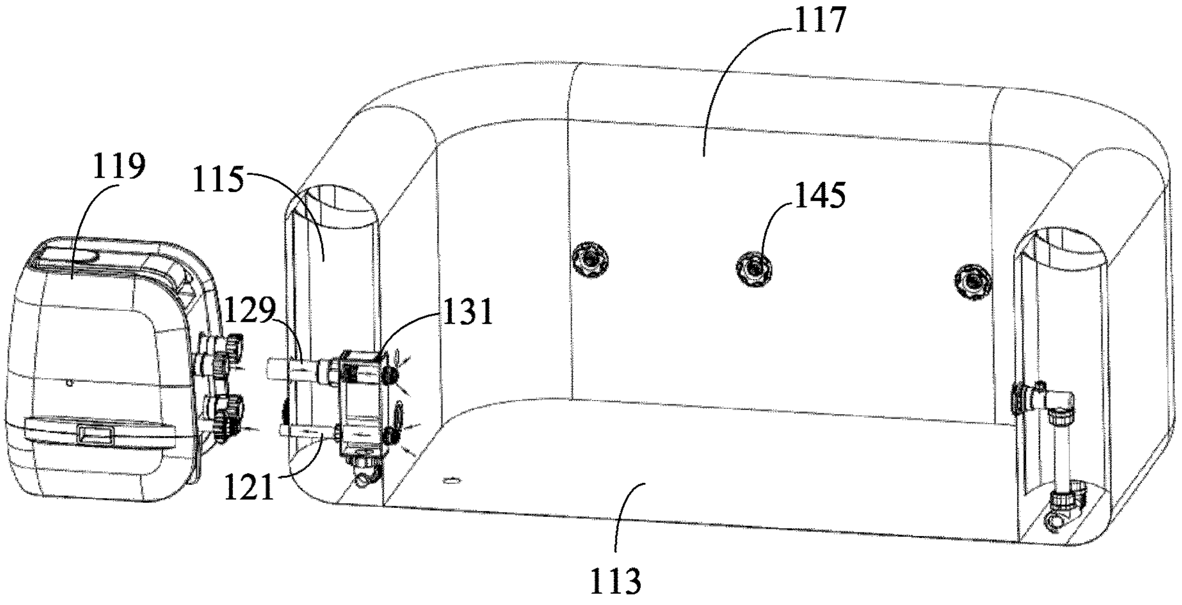
FIG. 6 is a cross-sectional perspective view of the inflatable massage pool including the water circulation system delivering a filtered water flow to the inflatable massage pool.
Figure 7:
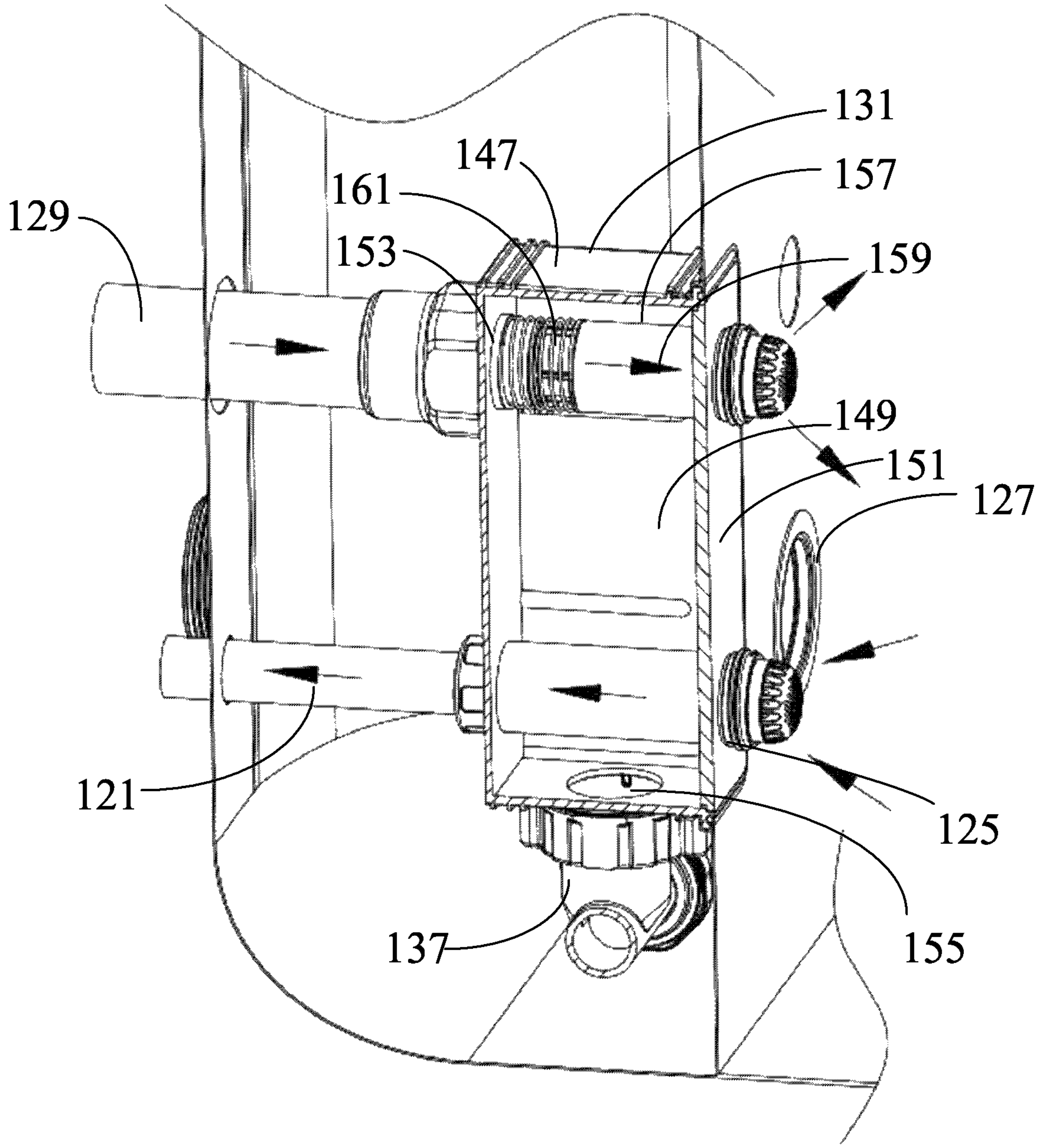
FIG. 7 is a partial enlarged cross-sectional view of a water guiding device of the inflatable massage pool delivering the filtered water flow.

The water circulation system 105 forms a massage water circulation system and a filtered water circulation system. For the massage water circulation system, as best illustrated in FIGS. 2 and 3 wherein the direction of the arrows indicate the direction of water flow, water flows from the water receiving cavity 117 into the massage water outlet pipe 123 of the water outlet assembly, passes through the massage water pump, then passes through the water inlet pipe 129, the water flow guiding device 131, the three-way pipe 137 and the massage water flow pipe 144 of the water inlet assembly, and is finally sprayed into the water receiving cavity 117 from the massage nozzles 145. Because the massage nozzles 145 are connected to the air pipe 143 of the air pipeline 139, air is sucked from the air inlet 141 of the air pipeline 139 and mixed with the water in the massage nozzles 145. Accordingly, when delivering the massage water flow to the water receiving cavity 117, the massage nozzles 145 spray bubbled water to the water receiving cavity 117. For the filtered water circulation system, as best illustrated in FIG. 6 wherein the direction of arrows indicates the direction of the water flow, water flows into the filtered water outlet pipe 121 of the water outlet assembly from the water receiving cavity 117, passes through the filtered water pump, and then returns to the water receiving cavity 117 through the water inlet pipe 129 and the water flow guiding device 131 of the water inlet assembly.

Figure 4:
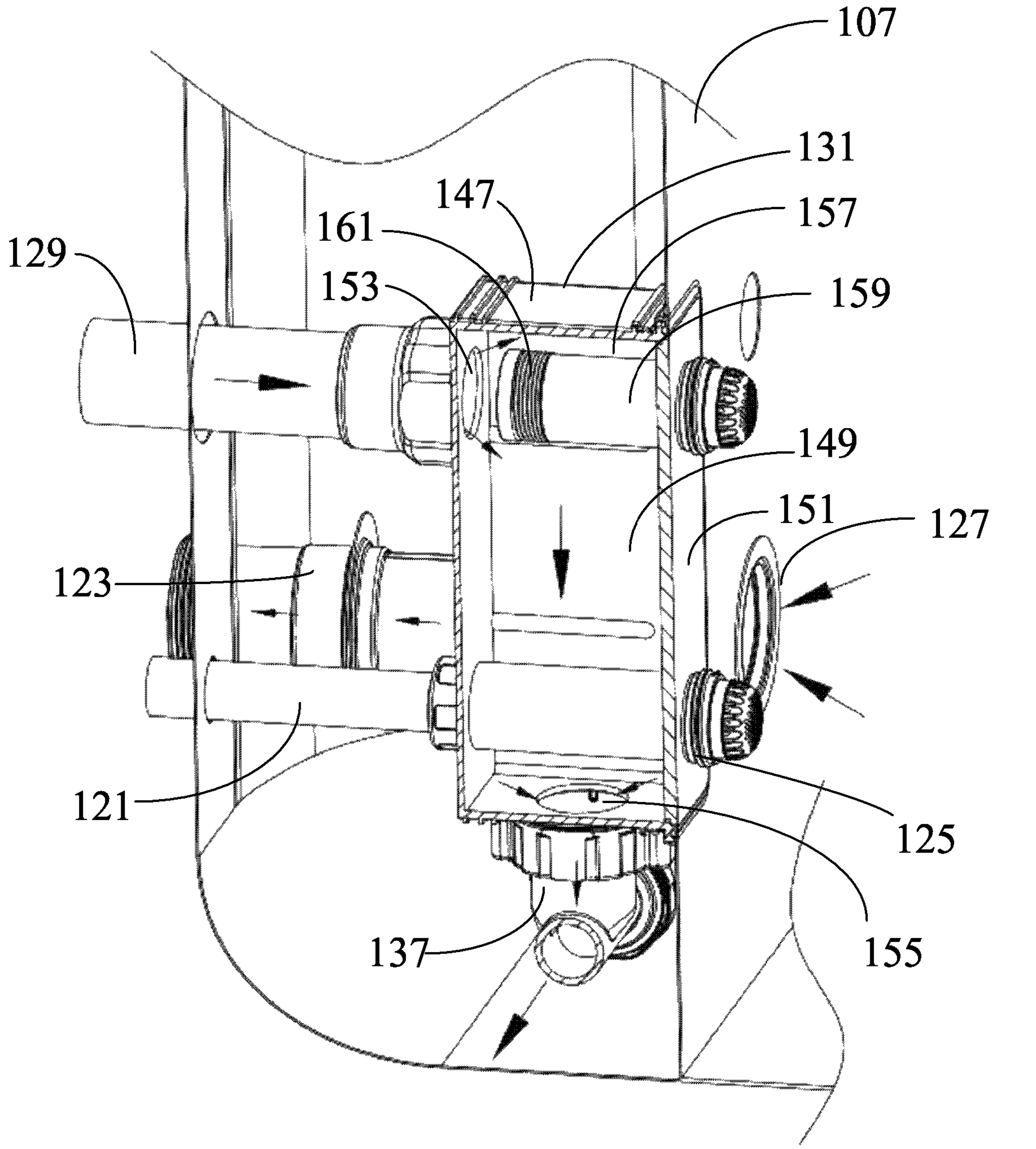
FIG. 4 is a partial enlarged cross-sectional view of a water guiding device of the inflatable massage pool delivering the massage water flow.
Figure 5:
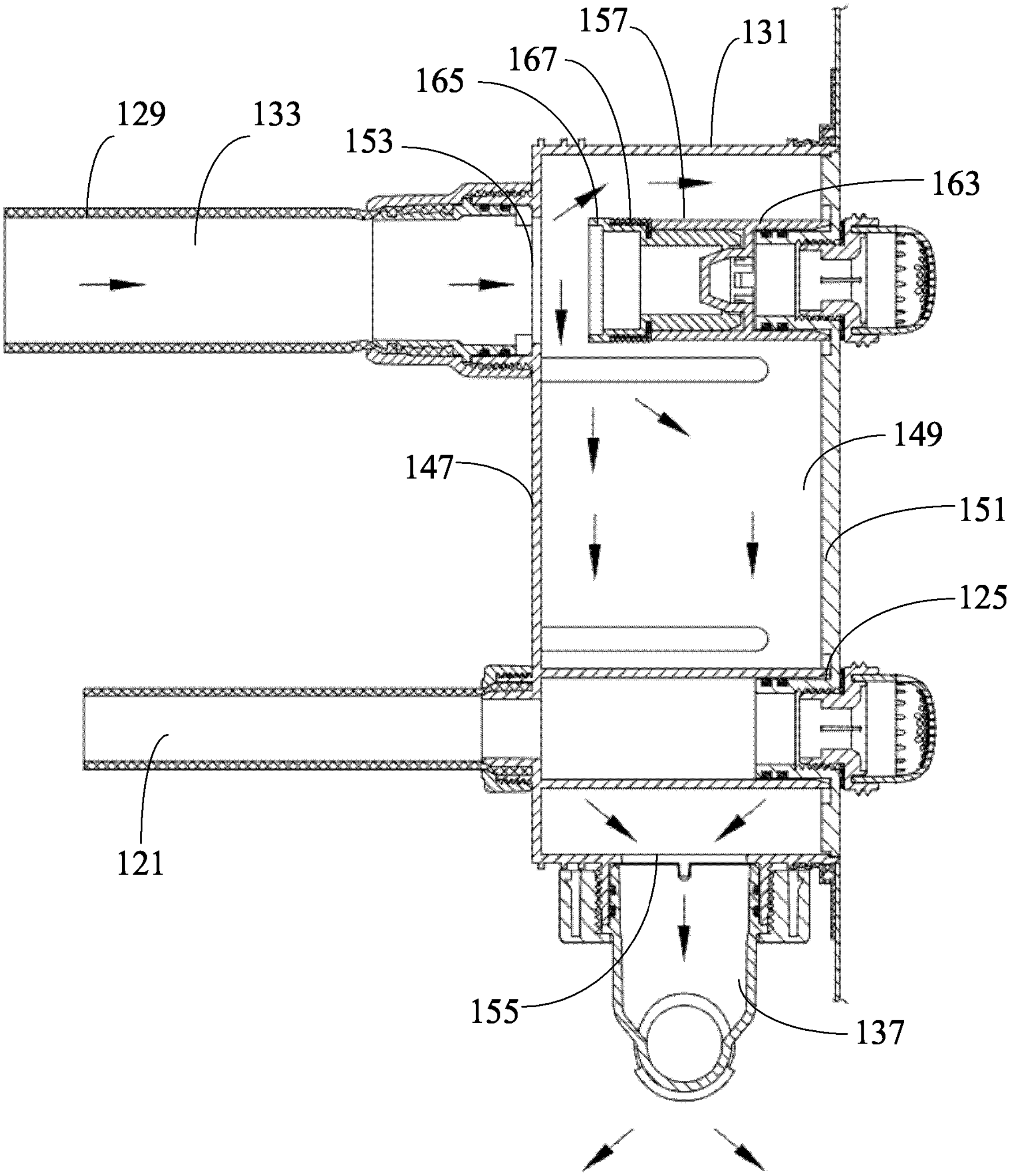
FIG. 5 is a cross-sectional view of the water guiding device delivering the massage water flow.

As shown in FIGS. 4 and 5, the water flow guiding device 131 includes a housing 147. The housing 147 defines a housing chamber 149. The housing 147 includes a panel 151. The panel 151 is located on the inner side wall 107 of the pool body 103 and is exposed to the water receiving cavity 117. The housing 147 defines a water inlet 153 and a water outlet 155. A retractable pipe 157 is located in the housing chamber 149. The water flow guiding device 131 is in fluid communication with the water inlet pipe 129 through the water inlet 153. The water flow guiding device 131 is also in fluid communication with the massage water flow pipeline 135 through the water outlet 155. Specifically, the water flow guiding device 131 is in fluid communication with the massage water flow pipeline 135 through the water outlet 155 via the three-way pipe 137. According to one embodiment of the present invention, the retractable pipe 157 has a fixed portion 159 and a retractable portion 161. The fixed portion 159 is coupled to the panel 151, and the retractable portion 161 is in communication with the water inlet 153. The retractable pipe 157 is movable between an expanded state and a contracted state. In the expanded state, the filtered water flow enters the water flow guiding device 131 via the water inlet 153, and is in fluid communication with the water inlet pipe 129 such that the filtered water flow enters the retractable pipe 157 and is directly delivered to the water receiving cavity 117. In the contracted state, the massage water flow enters the water flow guiding device 131 via the water inlet 153, and in this configuration (i.e., the contracted state), the fluid pressure of the massage water flow pushes the retractable portion 161 toward the fixed portion 159, thereby disconnecting direct fluid communication between the retractable portion 161 and water inlet pipe 129 such that the massage water flow enters the housing chamber 149 and is delivered to the water receiving cavity 117 through the massage water flow pipeline 135.

As best illustrated in FIG. 5, the retractable pipe 157 includes a fixed pipe 163 as the fixed portion 159 and a sliding pipe 165 as the retractable portion 161. An elastic member 167, such as a spring 167, is located between the fixed pipe 163 and the sliding pipe 165. The sliding pipe 165 is slidable relative to the fixed pipe 163. According to one embodiment of the present invention, the sliding pipe 165 is sheathed to the inside of the fixed pipe 163. One end of the spring 167 abuts against the sliding pipe 165, while the other end of the spring 167 abuts against the fixed pipe 163. It should be understood that the other end of the spring 167 (i.e., the end abutting the fixed pipe 163) may alternatively abut against, for example, the panel 151 of the housing 147. The spring 167 is configured such that the sliding pipe 165 connects to the water inlet 153 when the filtered water flow enters the water flow guiding device 131 via the water inlet 153, and such that the sliding pipe 165 is disconnected from the water inlet 153 when the massage water flow enters the water flow guiding device 131 via the water inlet 153.

Figure 8:
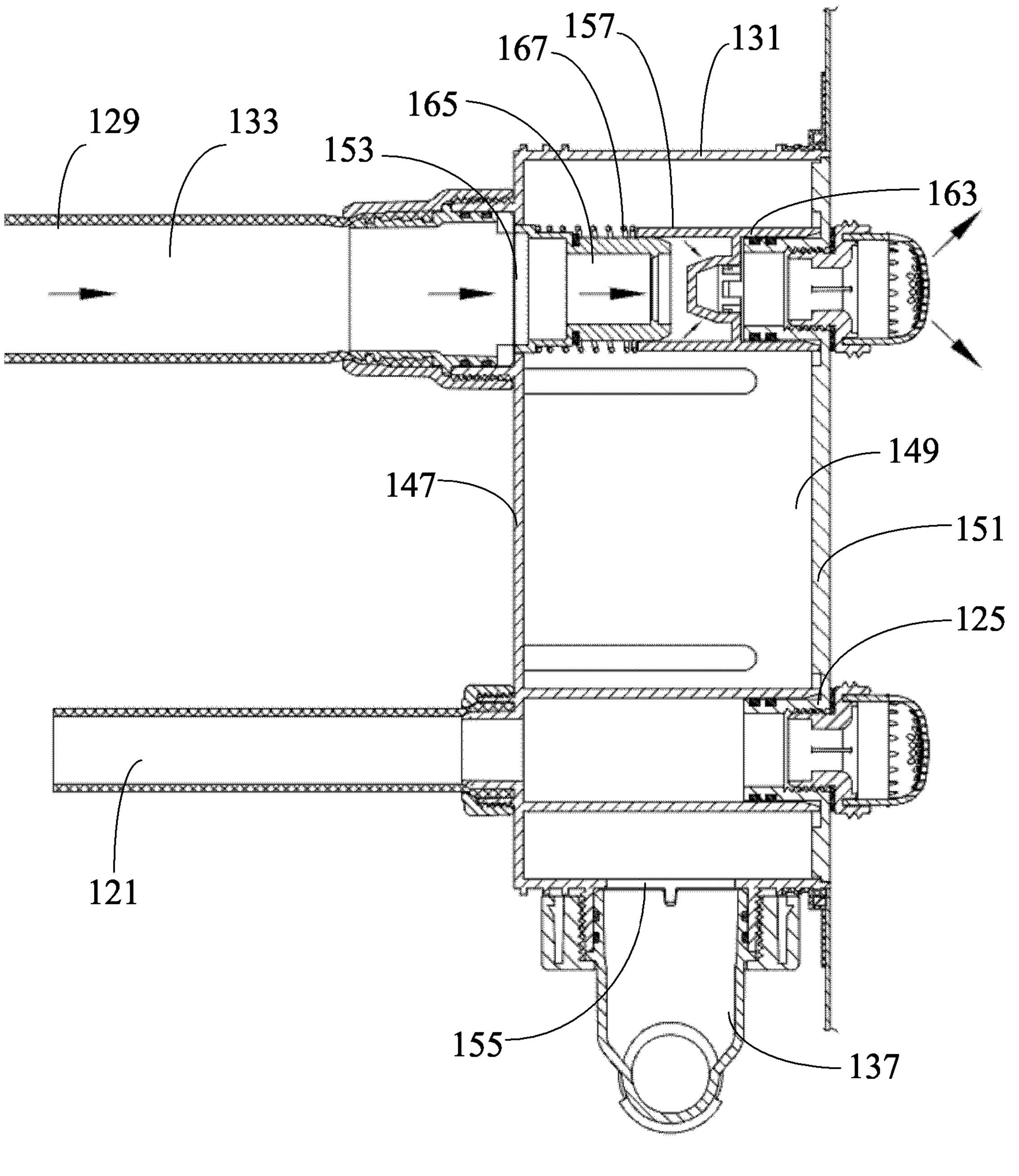
FIG. 8 is a cross-sectional view of the water guiding device delivering the filtered water flow.

The water flow guiding device 131 can guide the massage water flow and the filtered water flow, respectively. As shown in FIGS. 4 and 5 wherein the direction of the arrows represents the direction of the water flow, the spring 167 is compressed by a comparatively large fluid pressure generated by the comparatively large amount of the massage water flow directed toward the sliding pipe 165, so that the sliding pipe 165 is disconnected from the water inlet 153 of the water flow guiding device 131. Accordingly, the massage water flow enters into the housing chamber 149 of the water flow guiding device 131, thereafter entering the three-way pipe 137 from the water outlet 155 of the water flow guiding device 131, and reaching each massage nozzle 145 through the massage water flow pipe 144, and spraying into the water receiving cavity 117. As shown in FIG. 8 wherein the direction of the arrows represents the direction of water flow, due to the comparatively small amount fluid pressure from the filtered water flow, the sliding pipe 165 abuts against the water inlet 153 of the water flow guiding device 131 under the force of the spring 167. Thus, the filtered water flow enters into the water receiving cavity 117 through the water inlet pipe 129, the sliding pipe 165, and the fixed pipe 163 in sequence.

As best shown in FIGS. 4 through 8, the filtered water outlet pipe 121 penetrates through the water flow guiding device 131, wherein at least part of the filtered water outlet pipe 121 is located in the housing chamber 149, and the opening 125 at the water inlet end of the filtered water outlet pipe 121 is located on the panel 151. Accordingly, both the water inlet end of the filtered water outlet pipe 121 and the water outlet end of the fixed pipe 163 are integrated on the panel 151 of the water flow guiding device 131, thereby reducing the number of welding points on the inner side wall 107 of the pool body 103.

Figure 9:
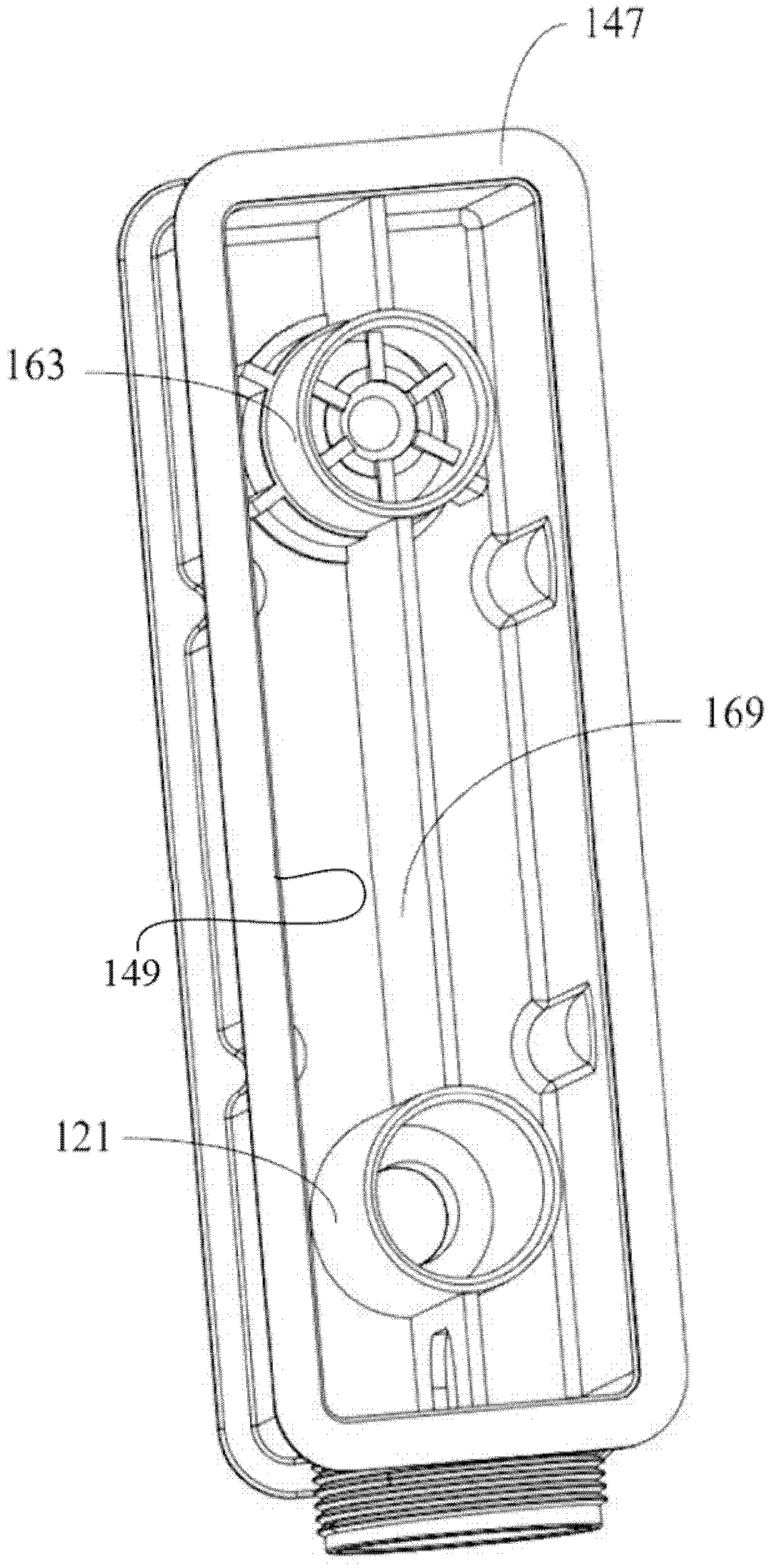
FIG. 9 is a perspective view of a housing without a panel of the water guiding device constructed in accordance with one embodiment of the present invention.

As shown in FIG. 9, the water flow guiding device 131 includes a fixing plate 169 located in the housing chamber 149, the fixing plate 169 being connected to the fixed pipe 163 and the filtered water outlet pipe 121. The fixing plate 169 also connects the fixed pipe 163 and the filtered water outlet pipe 121 to the housing 147. In other words, the fixing plate 169 is provided such that the fixed pipe 163 and the filtered water outlet pipe 121 can be connected to the housing 147 of the water flow guiding device 131 via a more firm connection.

Figure 10:
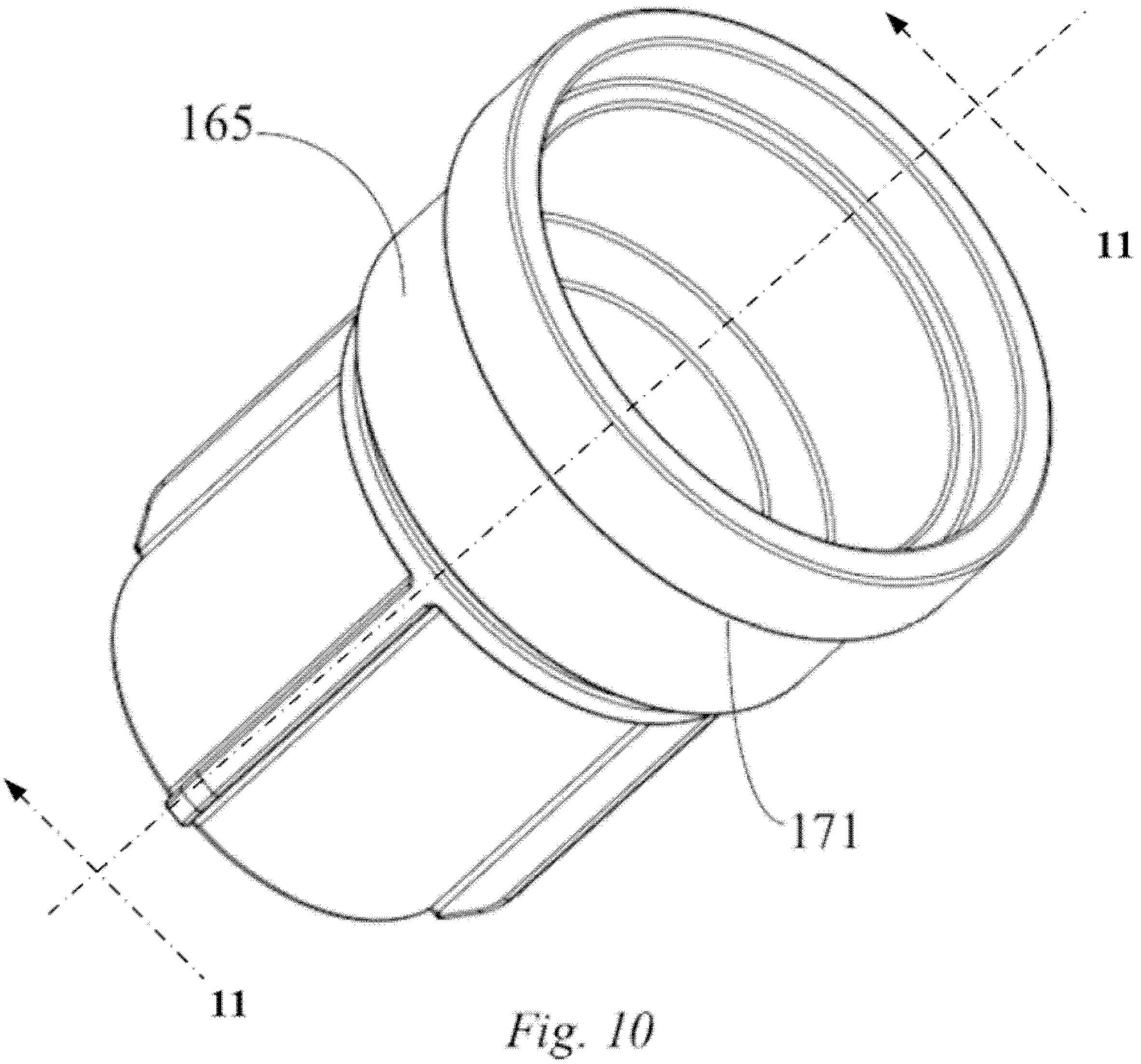
FIG. 10 is a perspective view of a retractable portion of a retractable pipe of the water guiding device constructed in accordance with one embodiment of the present invention.
Figure 11:
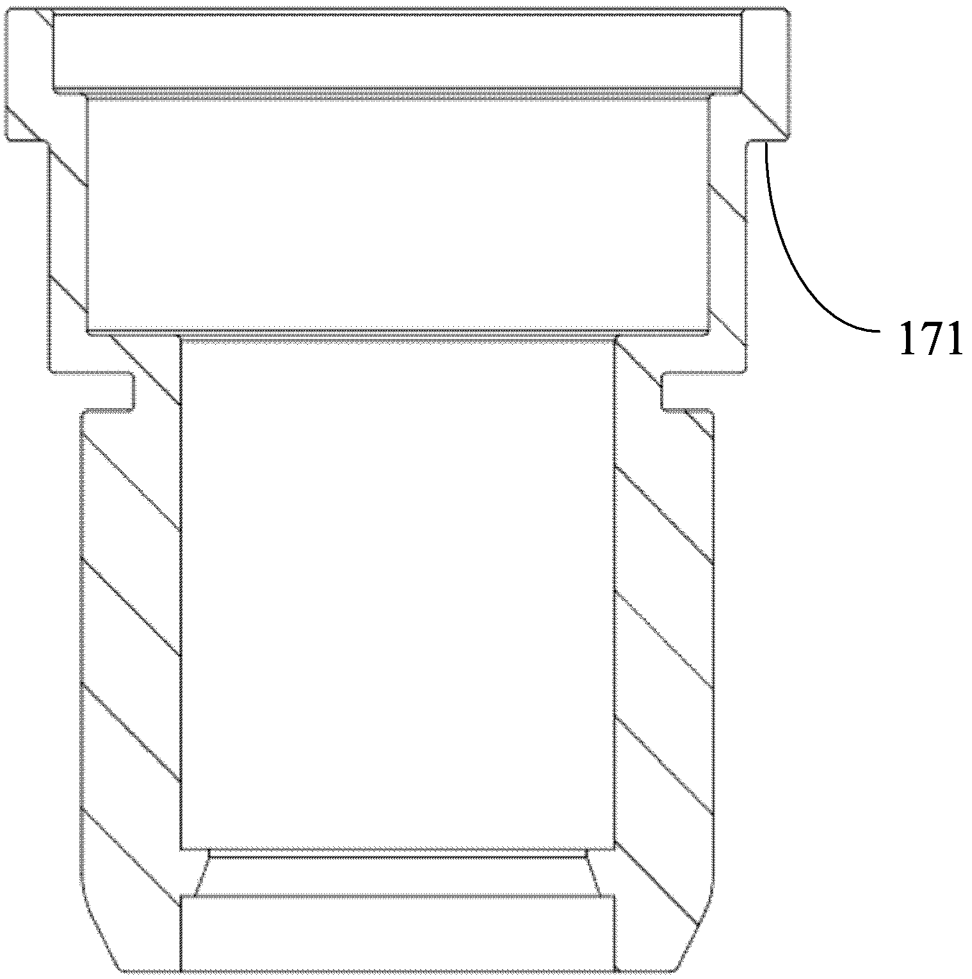
FIG. 11 is a cross-sectional view of the retractable portion of FIG. 10 along the lines 11-11.

As shown in FIGS. 10 and 11, a side wall of the sliding pipe 165 includes a stepped face 171, extending radially outwardly from the side wall of the sliding pipe 165, wherein one end of the spring 167 (not shown) abuts against the stepped face 171 to secure the spring 167 between the sliding pipe 165 and the fixed pipe 163, the panel 151, or the housing 147.

Embodiment 2

Figure 12:
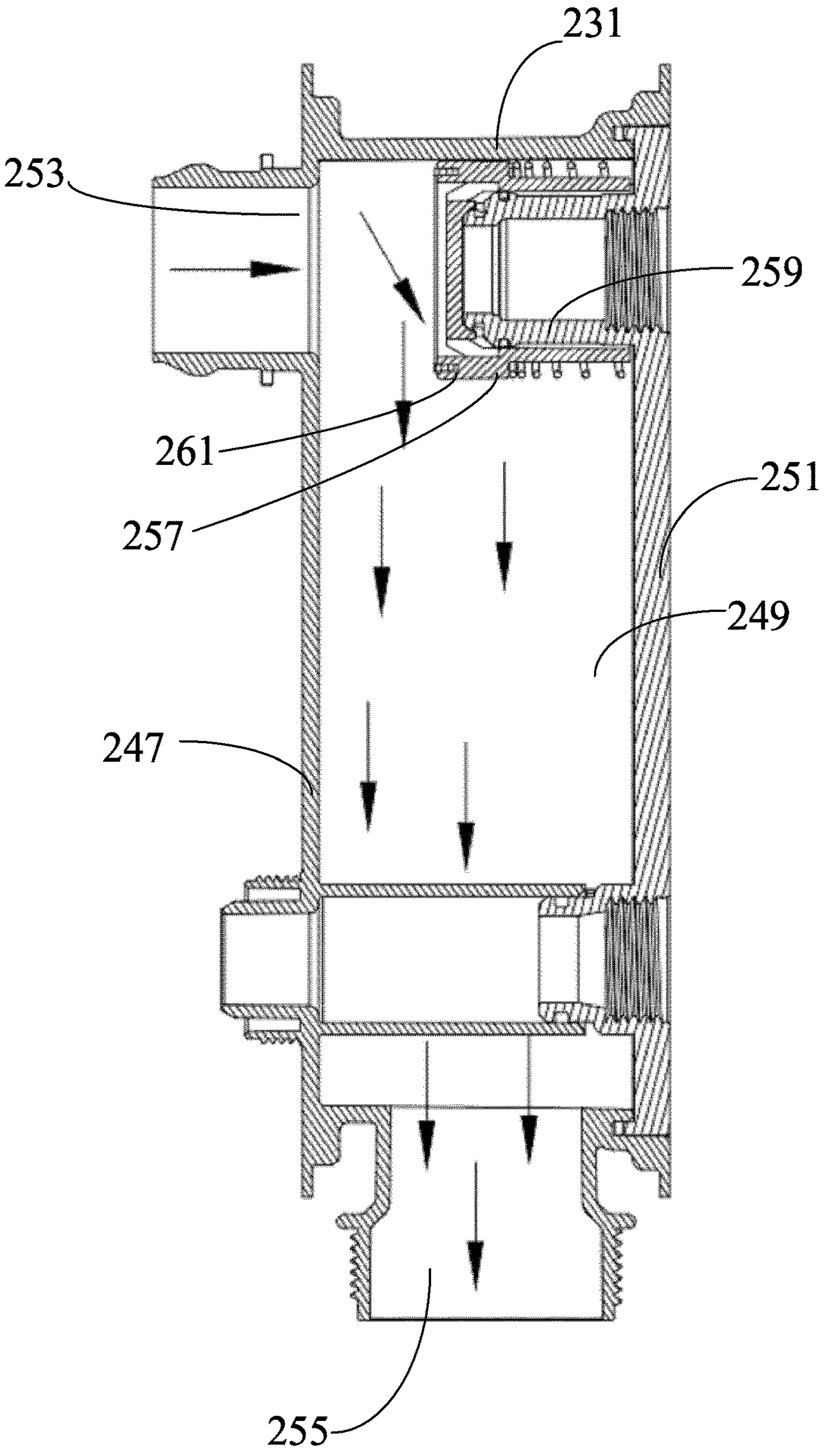
FIG. 12 is a cross-sectional view of a water guiding device delivering a massage water flow constructed in accordance with a second embodiment of the present invention.
Figure 13:
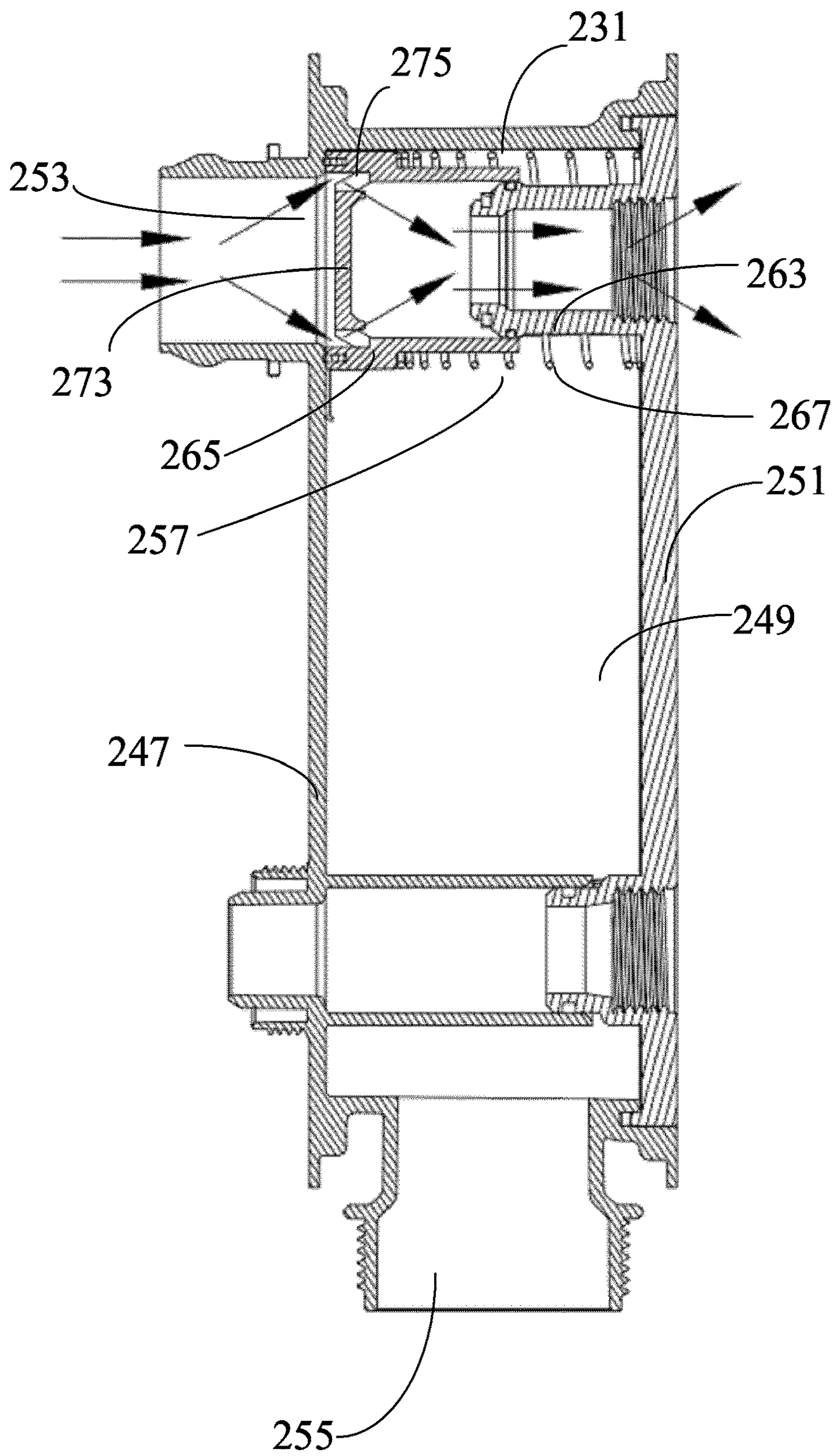
FIG. 13 is a cross-sectional view of a water guiding device delivering a filtered water flow constructed in accordance with the second embodiment of the present invention.

FIGS. 12 and 13 illustrates a water flow guiding device 231 constructed in accordance with another embodiment of the present invention. As shown in FIGS. 12 and 13, the water flow guiding device 231 includes a housing 247. The housing 247 defines a housing chamber 249. The housing 247 includes a panel 251. The panel 251 is located on an inner side wall of a pool body and is exposed to a water receiving cavity. The housing 247 defines a water inlet 253 and a water outlet 255. A retractable pipe 257 is located in the housing chamber 249. The water flow guiding device 231 is in fluid communication with a water inlet pipe through the water inlet 253, and the water flow guiding device 231 is in fluid communication with a massage water flow pipeline through the water outlet 255. The retractable pipe 257 includes a fixed portion 259 and a retractable portion 261. The fixed portion 259 is coupled to the panel 251, and the retractable portion 261 mates with the water inlet 253. According to one embodiment of the present invention, the retractable portion 261 is radially spaced apart from the fixed portion 259 and extends about the fixed portion 259. The retractable pipe 257 is movable between an expanded state (as shown in FIG. 13) and a contracted state (as shown in FIG. 12). In the expanded state, a filtered water flow enters the water flow guiding device 231 via the water inlet 253, and the retractable pipe 257 is in fluid communication with the water inlet pipe such that the filtered water flow enters the retractable pipe 257 for direct delivery to the water receiving cavity. In the contracted state, a massage water flow enters the water flow guiding device 231 via the water inlet 253, and the retractable pipe 257 is disconnected from the water inlet pipe such that the massage water flow enters the housing chamber 249 and is delivered to the water receiving cavity through the massage water flow pipeline.

Referring to FIG. 13, the retractable pipe 257 includes a fixed pipe 263 as the fixed portion 259 and a sliding pipe 265 as the retractable portion 261, as well as an elastic member 267, such as a spring 267, disposed between the fixed pipe 263 and the sliding pipe 265. The sliding pipe 265 is slidable relative to the fixed pipe 263. The sliding pipe 265 is located on an exterior surface of the fixed pipe 263. One end of the spring 267 abuts against the sliding pipe 265, while the other end of the spring 267 abuts against the panel 251. The spring 267 is configured such that the sliding pipe 265 connects to the water inlet 253 when the filtered water flow enters the water flow guiding device 231 via the water inlet 253, and the sliding pipe 265 disconnects from the water inlet 253 when the massage water flow enters the water flow guiding device 231 via the water inlet 253.

The water flow guiding device 231 guides the massage water flow and the filtered water flow, respectively. As shown in FIG. 12 wherein the direction of the arrows represents the direction of water flow, the spring 267 is compressed by a comparatively large fluid pressure generated by the comparatively large amount of the massage water flow directed towards the sliding pipe 265, thereby disconnecting the sliding pipe 265 from the water inlet 253 of the water flow guiding device 231. Accordingly, the massage water flow enters into the housing chamber 249 of the water flow guiding device 231, thereafter entering a three-way pipe from the water outlet 255 of the water flow guiding device 231 and reaching each massage nozzle through a massage water flow pipe to spray into the water receiving cavity. As shown in FIG. 13 wherein the direction of the arrows represents the direction of the water flow, due to a comparatively small amount fluid pressure of the filtered water flow, the sliding pipe 265 abuts against the water inlet 253 of the water flow guiding device 231 under the force of the spring 267. Accordingly, the filtered water flow flows into the water receiving cavity through the water inlet pipe, the sliding pipe 265, and the fixed pipe 263.

Figure 14:
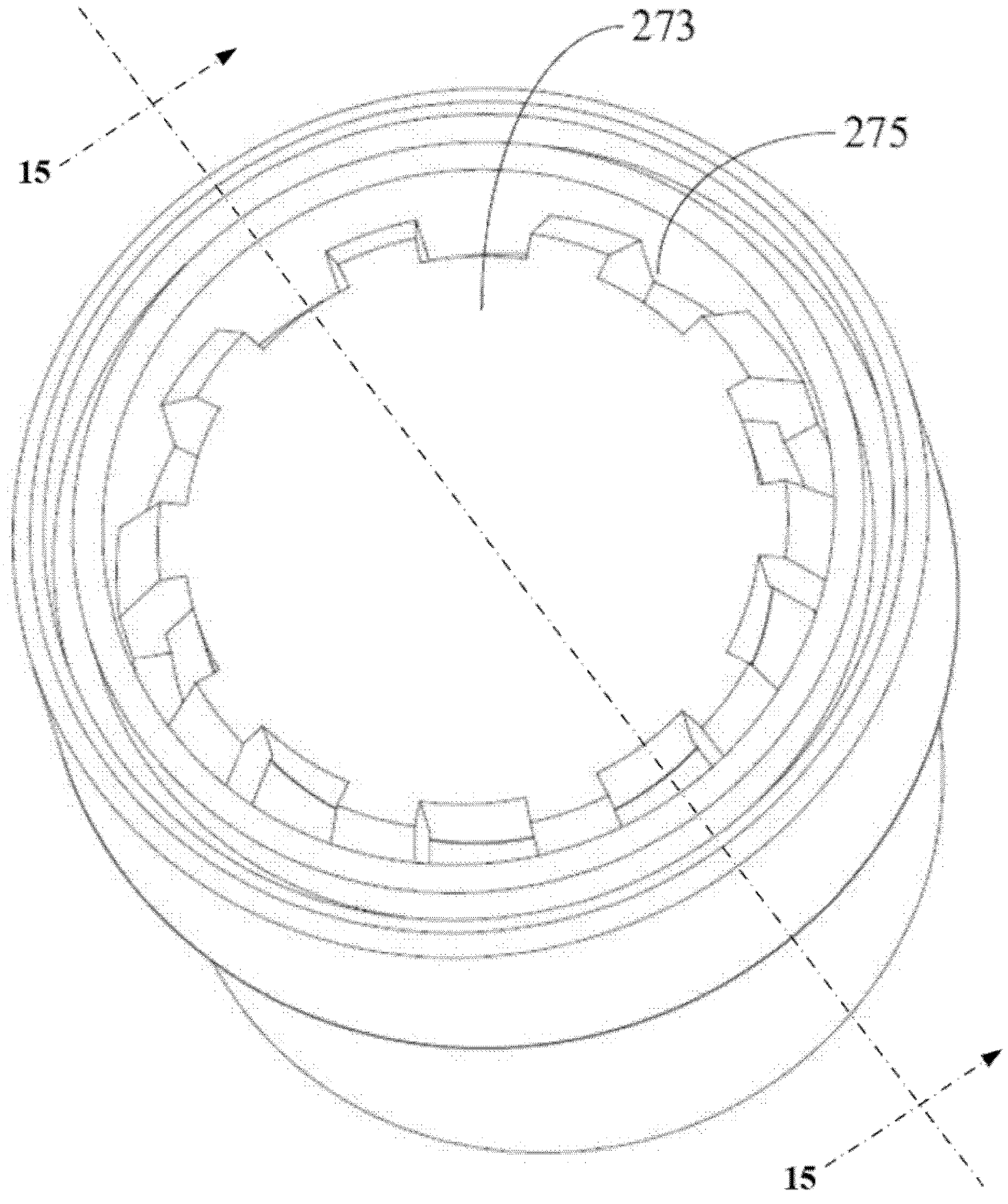
FIG. 14 is a perspective view of a retractable portion of a retractable pipe of the water guiding device constructed in accordance with the second embodiment of the present invention.
Figure 15:
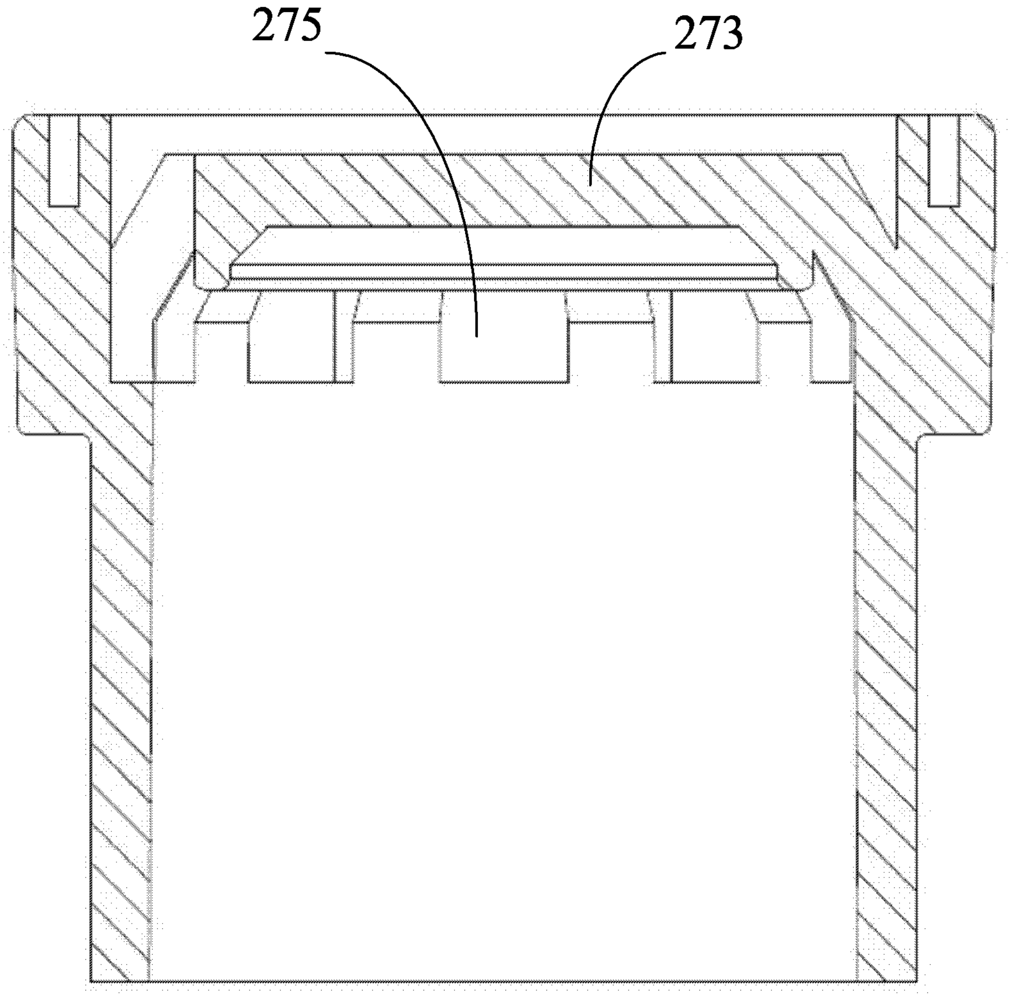
FIG. 15 is a cross-sectional view of the retractable portion of FIG. 14 along the lines 15-15.

As shown in FIGS. 13 to 15, the sliding pipe 265 includes a baffle 273 disposed near the end of the sliding pipe 265, facing the water inlet 253. The baffle 273 may be subjected to the hydraulic pressure of the filtered water flow or the massage water flow from the water inlet pipe. Since the baffle 273 is provided, the sliding pipe 265 can move between the expanded state and the contracted state in response to the hydraulic pressure of the filtered water flow or the massage water flow from the water inlet pipe more effectively.

As shown in FIGS. 13 to 15, at least one water inlet orifice 275 is provided between a periphery of the baffle 273 and an inner surface of the sliding pipe 265. According to one embodiment of the present invention, as best show in FIG. 14, the at least one water inlet orifice 275 includes a plurality of water inlet orifices 275 located between the periphery of the baffle 273 and the inner surface of the retractable portion 261 and circumferentially spaced apart from one another. Still referring back to FIG. 14, during the filtered water flow, after passing through the water inlet pipe, the filtered water flow enters the sliding pipe 265 from the water inlet orifices 275 at the periphery of the baffle 273, and then flow into the water receiving cavity via the fixed pipe 263.

Embodiment 3

Embodiment 3 mainly differs from Embodiment 1 and Embodiment 2 in the arrangement of a water flow guiding device 331.

In accordance with this embodiment of the present invention, the water flow guiding device 331 can deliver a filtered water flow or a massage water flow to a water receiving cavity through a massage water flow pipeline.

Figure 16:
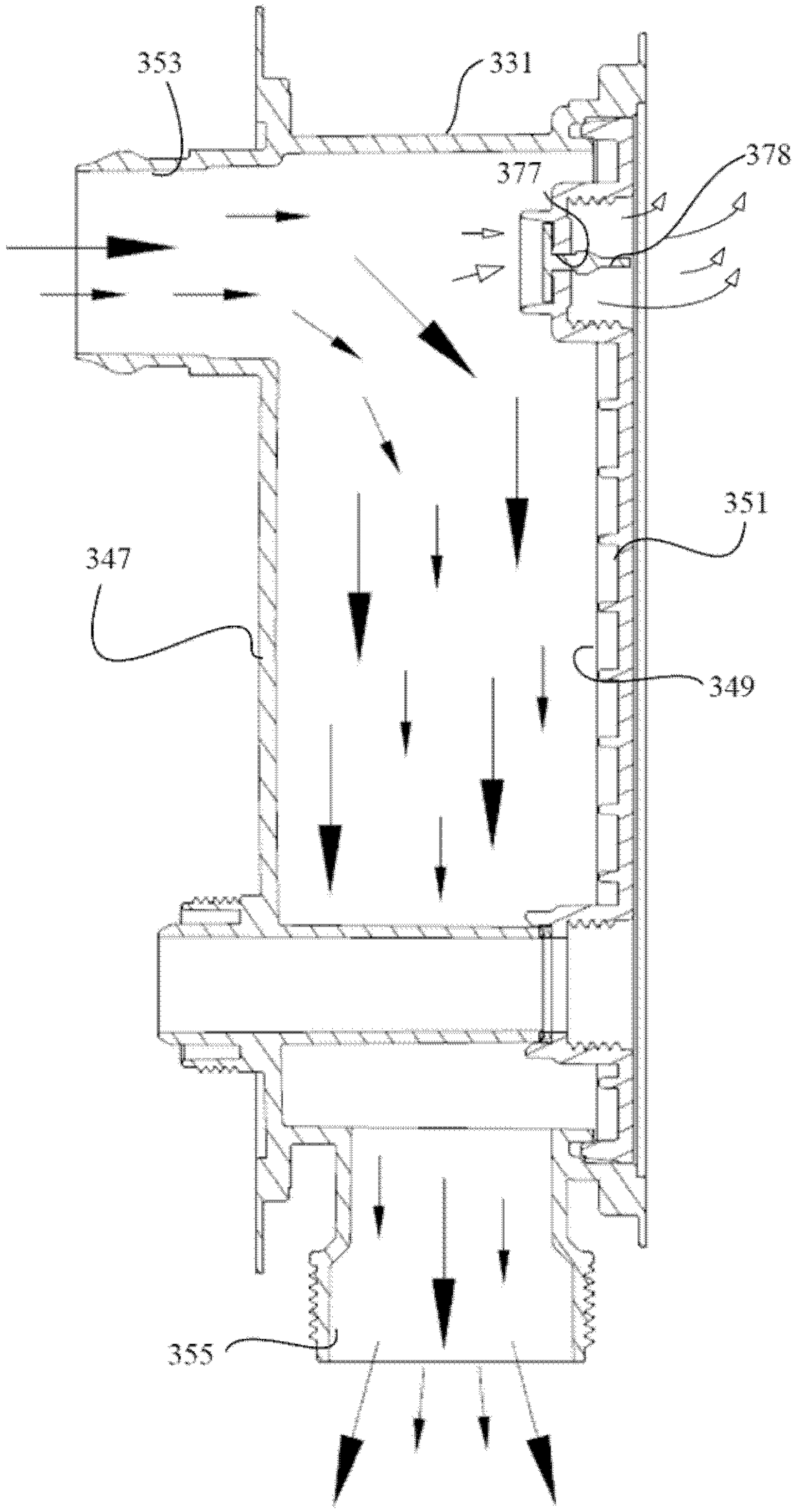
FIG. 16 is a cross-sectional view of a water guiding device delivering a massage water flow constructed in accordance with a third embodiment of the present invention.
Figure 17:
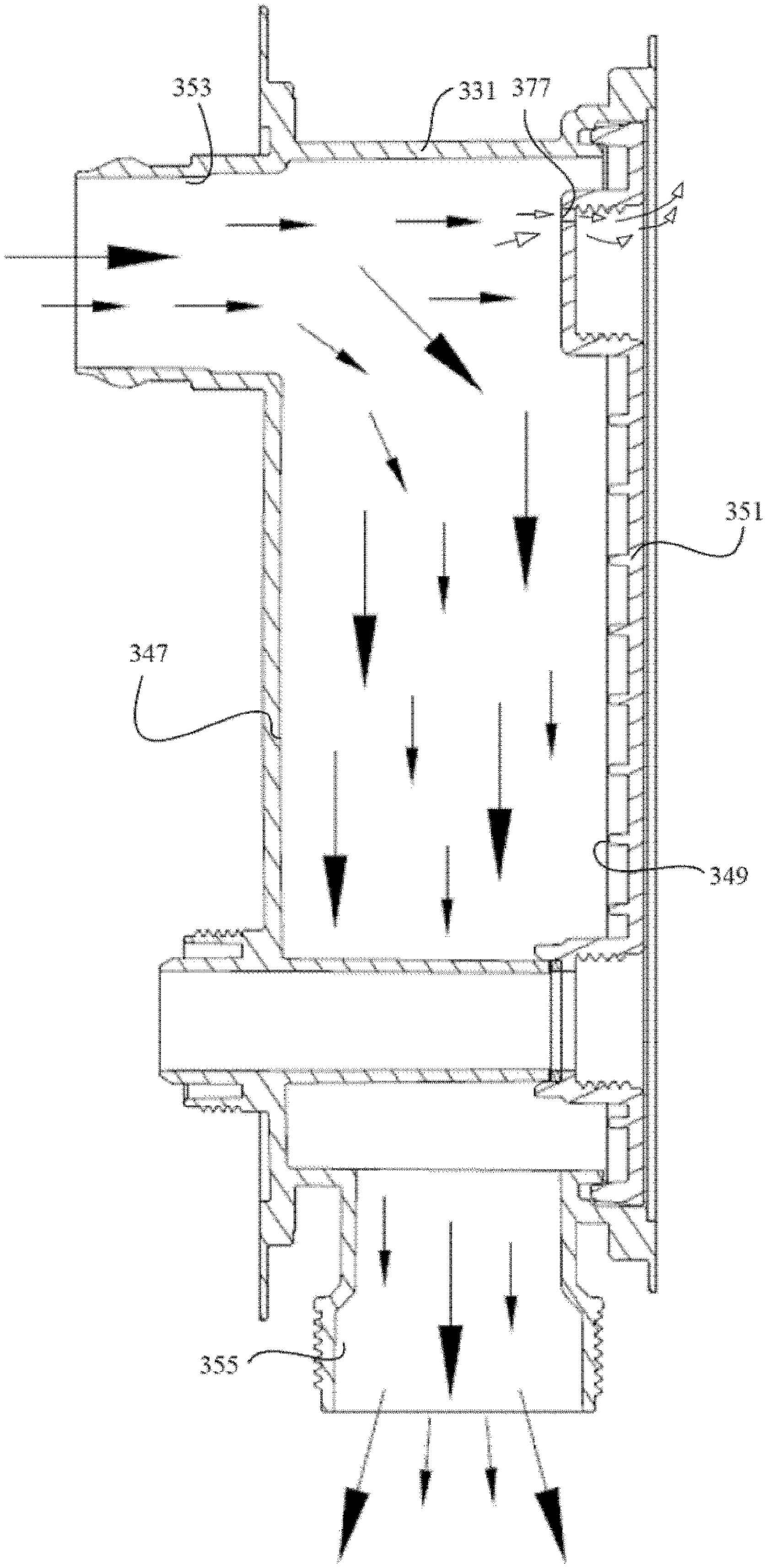
FIG. 17 is a cross-sectional view of a water guiding device delivering a massage water flow constructed in accordance with the third embodiment of the present invention.

As shown in FIGS. 16 and 17, the water flow guiding device 331 comprises a housing 347. The housing 347 defines a housing chamber 349. The housing 347 includes a panel 351. The panel 351 is located on an inner side wall of a pool body and exposed to the water receiving cavity. The housing 347 defines a water inlet 353 and a water outlet 355. The panel 351 is provided with a vent port 377, the vent port 377 being located at an upper portion of the housing 347. The water flow guiding device 331 is in fluid communication with a water inlet pipe through the water inlet 353, and the water flow guiding device 331 is in fluid communication with the massage water flow pipeline through the water outlet 355.

As best illustrated in FIGS. 16 and 17 wherein the direction of the dark arrows represents the direction of water flow and the direction of the light arrows represents the direction of air flow, during the massage water flow or the filtered water flow, water flows from the water inlet pipe to the water flow guiding device 331, a three-way pipe, and then a massage water flow pipe, thereafter spraying to the water receiving cavity by the massage nozzles, whether massage water flow or filter water flow is utilized.

The vent port 377 is provided such that in response to an activation of the massage water pump, air in the massage water pump and the water inlet pipe is able to be discharged through the vent port 377. According to one embodiment of the present invention, a valve 378 can be located in the vent port 377 for allowing the air flow through the vent port 377. At the same time, the valve 378 also prevents the backflow of water from the water receiving cavity through the vent port 377. According to another embodiment of the present invention, the vent port 377 may be used to mount a chemical dispenser.

The presence of the vent port 377 solves the problems of pump activation and pump cavitation. More specifically, when the massage water pump or the filter water pump activates, if the impeller is not entirely submerged in water and partially exposed to air, the impeller of the massage water pump or the filter water pump can spin idly and not deliver the desired massage water flow or the filter water flow. Alternatively, the pump activation problem can be caused by a water backflow in the inflatable pool. For example, before activation of the motor, water in the inflatable pool can backflow through the massage nozzle(s) and into the water flow guiding device. The water backflow causes a water level increase in the water flow guiding device. Accordingly, air inside the upper portion of the chamber of the housing 347 can be pushed into the motor via the water inlet pipe. When air is pushed into the motor, it causes the impeller to be only partially immersed in water, thereby causing the impeller to spin idly and not deliver the desired massage water flow or the filter water flow. By incorporating the vent port 377, this embodiment of the present invention allows the air to escape the pump via the vent port 377, thereby allowing the impeller to be completely submerged in water and provide the desired delivery of massage water flow or filter water flow.

During operation of the massage water pump or the filter water pump, pump cavitation can occur due to an increase in temperature/pressure in the pump and/or the massage water circulation system. Accordingly, air bubbles formed during pump cavitation can accumulate in the upper portion of the chamber of the housing 347. As air bubbles accumulate, the air pressure increases in the chamber of the housing 347 thereby preventing the desired water flow from the water inlet pipe into the water flow guiding device 331. By incorporating the vent port 377, this embodiment of the present invention allows air bubbles to escape the chamber of the housing 347 via the vent port 377, thereby reducing air pressure inside of the water flow guiding device 331. Additionally, allowing air bubbles to escape from the vent port 377 also prevents the air bubbles from collapsing inside the pump thereby improving the operational life of the pump.

It can be seen from the embodiments described above that the inflatable massage pool according to the present invention has at least the following effects: a single water inlet pipe with a single water inlet passage and a water flow guiding device are used to guide a massage water flow and a filtered water flow into a water receiving cavity in different paths or the same path, thereby reducing welding points on a pool wall, lowering the manufacturing cost, and reducing the difficulty in pipeline arrangement.

Persons skilled in the art could readily recognize from such discussions and from the drawings and claims that various changes, modifications and variations may be made therein without departing from the true spirit and reasonable scope of the present invention defined by the following claims.

What is claimed is:

1. An inflatable massage pool, comprising:

a pool body defining an inflatable cavity and a water receiving cavity; and a water inlet assembly located in said inflatable cavity and configured to provide one of a filtered water flow or a massage water flow to said water receiving cavity said water inlet assembly comprising:

a water inlet pipe;

a water flow guiding device including a housing and in fluid communication with said water inlet pipe for delivering one of said filtered water flow or said massage water flow from said water inlet pipe to said water receiving cavity, the housing comprising:

a housing chamber;

a panel located on an inner side wall of said pool body;

a water inlet in fluid communication with said water inlet pipe and being positioned adjacent an upper portion of said housing;

a water outlet in fluid communication with a massage water flow pipeline and being positioned adjacent a lower portion of said housing; and a retractable pipe positioned in said housing chamber and being coupled to said upper portion of said housing in fluid communication with said water receiving cavity;

wherein said retractable pipe is movable between an expanded state and a contracted state, such that, when said retractable pipe is in said expanded state, said retractable pipe is in fluid communication with said water inlet pipe to allow direct delivery of said filtered water flow into said water receiving cavity and, when said retractable pipe is in said contracted state, said retractable pipe is disconnected from said water inlet pipe to allow delivery of said massage water flow to said massage water flow pipeline through said water outlet.

2. The inflatable massage pool according to claim 1, wherein said filtered outlet pipe is located adjacent a lower portion of said housing and extends through said housing for discharging water from said water receiving cavity for filtration.

3. The inflatable massage pool according to claim 1, wherein said water flow guiding device includes a fixing plate, located in said housing, extending between a fixed portion of said retractable pipe and said filtered outlet pipe and coupled to said fixed portion and said filtered outlet pipe.

4. The inflatable massage pool according to claim 1, wherein said water inlet assembly includes said massage water flow pipeline in fluid communication with said water flow guiding device, and wherein said water flow guiding device is configured to deliver said filtered water flow to said water receiving cavity and to deliver said massage water flow to said water receiving cavity through said massage water flow pipeline.

5. The inflatable massage pool according to claim 4, wherein said massage water flow pipeline is coupled to said water flow guiding device via a three-way pipe for receiving said massage water flow from said water inlet assembly.

6. The inflatable massage pool according to claim 4, wherein said water inlet assembly includes one or more air pipelines, wherein each of said one or more air pipelines has an air inlet and an air pipe, each said air pipe being in fluid communication with a respective air inlet; and wherein said massage water flow pipeline includes a plurality of massage water flow pipes and a plurality of massage nozzles, each massage nozzle of said plurality of massage nozzles being in fluid communication with a respective massage water flow pipe and a respective air pipe for delivering said massage water flow into said water receiving cavity.

7. The inflatable massage pool according to claim 1, wherein said housing further defines a vent port; wherein said water inlet pipe is in fluid communication with said water inlet, said water inlet being located adjacent an upper portion of said housing and said water outlet being located adjacent a lower portion of said housing; and wherein said vent port is in fluid communication with an opening in said panel and near said upper portion of said housing for discharging air.

8. The inflatable massage pool according to claim 7, further including a valve disposed in said vent port.

9. The inflatable massage pool according to claim 7, wherein said water flow guiding device includes a filtered outlet pipe located near a lower portion of said housing and extending through said housing for discharging water from said water receiving cavity for filtration.

10. The inflatable massage pool according to claim 1, wherein said retractable pipe includes: a fixed portion coupled to said housing; and a retractable portion being slidable relative to said fixed portion between said expanded state and said contracted state.

11. The inflatable massage pool according to claim 10, wherein said retractable portion is sheathed inside said fixed portion.

12. The inflatable massage pool according to claim 10, wherein said retractable portion is radially spaced apart from said fixed portion and extends about said fixed portion.

13. The inflatable massage pool according to claim 10, further including an elastic member located between said fixed portion and said retractable portion; wherein said elastic member connects said retractable portion in said expanded state with said water inlet to allow said filtered water flow to be directly delivered into said water receiving cavity, and wherein said elastic member disconnects said retractable portion in said contracted state from said water inlet to allow said massage water flow to exit said water flow guiding device through said water outlet.

14. The inflatable massage pool according to claim 13, wherein said elastic member comprises a spring with one end of said spring abutting said retractable portion and another end of said spring abutting said fixed portion or abutting said panel.

15. The inflatable massage pool according to claim 10, wherein said retractable portion includes a baffle located at an end of said retractable portion and facing said water inlet to subject said retractable portion to a fluid pressure from one of said filtered water flow or said massage water flow.

16. The inflatable massage pool according to claim 15, wherein said baffle defines a plurality of water inlet orifices in fluid communication with said water inlet.

17. The inflatable massage pool according to claim 16, wherein said plurality of water inlet orifices are located between a periphery of said baffle and an inner surface of said retractable portion and circumferentially spaced apart from one another.

18. An inflatable massage pool, comprising:

a pool body defining an inflatable cavity and a water receiving cavity; and a water inlet assembly located in said inflatable cavity and configured to provide one of a filtered water flow or a massage water flow to said water receiving cavity, said water inlet assembly comprising:

a housing defining a housing chamber, said housing including a panel located on an inner side wall of said pool body, said panel being exposed to said water receiving cavity;

a water inlet pipe having a water inlet passage; and a water flow guiding device including a fixing plate, located in said housing, extending between a fixed portion of a retractable pipe and a filtered outlet pipe and coupled to said fixed portion and said filtered outlet pipe;

wherein water inlet passage of said water inlet pipe is in fluid communication with said water flow guiding device for delivering one of said filtered water flow or said massage water flow from said water inlet pipe to said water receiving cavity.

* * * * *